United States Patent

Boehm

[15] 3,657,704

[45] Apr. 18, 1972

[54] MAGNETIC TAPE READOUT SIGNAL PROCESSING SYSTEMS

[72] Inventor: Albert L. Boehm, Boulogne, France

[73] Assignee: Compagnie Internationale Pour L'Informatique, Louvechiennes, France

[22] Filed: May 18, 1970

[21] Appl. No.: 38,191

[30] Foreign Application Priority Data

June 3, 1969 France ..............................69/18202

[52] U.S. Cl. ......................................340/172.5, 340/174.1 B

[51] Int. Cl. ..............................................G11b 5/00

[58] Field of Search ..............................340/172.5, 174.1 B

[56] References Cited

UNITED STATES PATENTS 2,823,255 2/1958 Hall ..............................340/174.1 X 3,054,990 9/1962 Noonan ..............................340/174.1

3,451,049 6/1969 Horning ..............................340/174.1

*Primary Examiner*—Raulfe B. Zache

*Attorney*—Kemon, Palmer & Estabrook

[57] ABSTRACT

A system is provided for processing the signals read out from a phase modulated recorded magnetic tape. From each track of the tape are derived two distinct series of digital value significant pulses in which nonsignificant pulses appear. The system provides for elimination of such nonsignificant pulses and rearrangement of the remaining pulses for temporary registration in a plural stage assembly elementary register. It further provides for detection of various defects resulting from dynamic and magnetic skew and casual reconstitution of mutilated characters.

11 Claims, 3 Drawing Figures

Patented April 18, 1972

3,657,704

2 Sheets-Sheet 1

INVENTOR

Albert F. Boehm

Kemon, Palmer & Estabrook

ATTORNEYS

INVENTOR

Albert L. Boehm

Kemon, Palmer & Estabrook

ATTORNEYS

MAGNETIC TAPE READOUT SIGNAL PROCESSING SYSTEMS

SUMMARY OF THE INVENTION

The present invention concerns improvements in or relating to the readout operations of magnetic tapes on which binary information has been recorded through a phase modulation process on as many parallel tracks as there are digits in a character.

The readout proper of the information bits from each track of such a recorded tape is conventionally made as follows: a twin magnetic head delivers a first series of "1's" representative signals and a second series of "0" representative signals. From appropriate treatment, each one of said series of signals is converted into a sequence of bit significant pulses which may be disturbed by casual nonsignificant pulses due to the readout of tape magnetization changes of condition in accordance with the sequence of the binary values along the concerned track. If read-in and readout conditions were perfect, a logical OR operation on these two sequences of pulses would give a uniform series of pulses with a recurrence frequency solely determined by the speed of the drive of the tape under the readout head. Unfortunately, such read-in and readout conditions cannot be so satisfactorily controlled. The problem solved by the invention is to provide a processing system which, in view of the final reassembly of the pulses into successive characters, duly takes into account the true, and deficient, conditions under which the read-in and readout operations occur.

The main sources of errors and mispresentations of the signals may be stated as follows:

The variations in the drive of the magnetic tape at the read-in and readout sets, as appearing during any individual read-in or readout operation and as appearing between read-in operations and read-in control readout operations, entail variations in the presentation of the series of pulses;

The insufficiencies of uniformity of the magnetic tape, such as those known as magnetic skew, as well as the mechanical defects of said tape, may also entail such variations in the presentation of the series of pulses and, further, lead to certain losses of information (which are usually detected from a control readout operation immediately following a read-in operation, as known);

Such defects are reinforced from the conventional asynchronous control of the magnetic tape.

According to the invention, a magnetic tape read-out signal processing system comprises for each magnetic track thereof a readout channel, a first sub-assembly for conditioning and handling the two incoming series of pulses respectively significant of the "1" and "0" binary digit values and a second sub-assembly for exploitation of said conditioned series of pulses in view of character reconstitution, wherein said first sub-assembly includes means for canceling nonsignificant pulses in said two incoming series of pulses and means for temporarily storing the significant pulses of said series for their application to corresponding inputs of a shift register, a part of said second sub-assembly.

SHORT DESCRIPTION OF DRAWINGS

FIG. 1 shows a detailed block arrangement of processing system according to the invention; and, FIGS. 2 and 3 are diagrams facilitating the explanation of operation of the arrangement of FIG. 1.

The arrangement of FIG. 1 broadly comprises:

A first sub-assembly comprised of the circuits referred to as (A) and (B) with which are associated a timing control circuit (C) and a circuit (H) devoted to the detection of any positioning error of the pulses applied to the input channel of said first sub-assembly. The main purpose of said first sub-assembly is to ensure cancellation from the incoming sequences of pulses any and all nonsignificant pulses N which may occur therein. As stated above, such non significant pulses are generated at a readout by the magnetization reversals or transitions of the tape occurring between two successive bits of the same binary digital value. However, the cancellation is made with consideration of the magnetic skew, circuit (B) being specially devoted to elimination of the effects of such skew, circuit (A) being used to cancel the nonsignificant pulse proper. A further purpose of said first sub-assembly is to re-condition the true information signals for their application to the inputs of a shift register E which constitutes the essential part of the second sub-assembly.

Said second sub-assembly, straightforwardly placed under the control of the first one, includes, further to said shift register (E) fed with the pulses issuing from circuit (B) of the first sub-assembly, a triggering circuit (D) for controlling the introduction of data into said register and the progression of such data therethrough, a circuit (G) for correcting any loss of information in such register (E), and a circuit (F) controlling the transfer of the content of said register (E) to the outputs of the re-assembled characters. Circuit (F) is controlled from an output of circuit (G) and from a test of the condition of the content of the last stage of the shift register. Circuit (G) is controlled from outputs of circuit (A) of the first sub-assembly. Both circuits (F) and (G) are additionally controlled by outlets of circuit (C) of the first sub-assembly.

DETAILED DESCRIPTION

Figure 1:
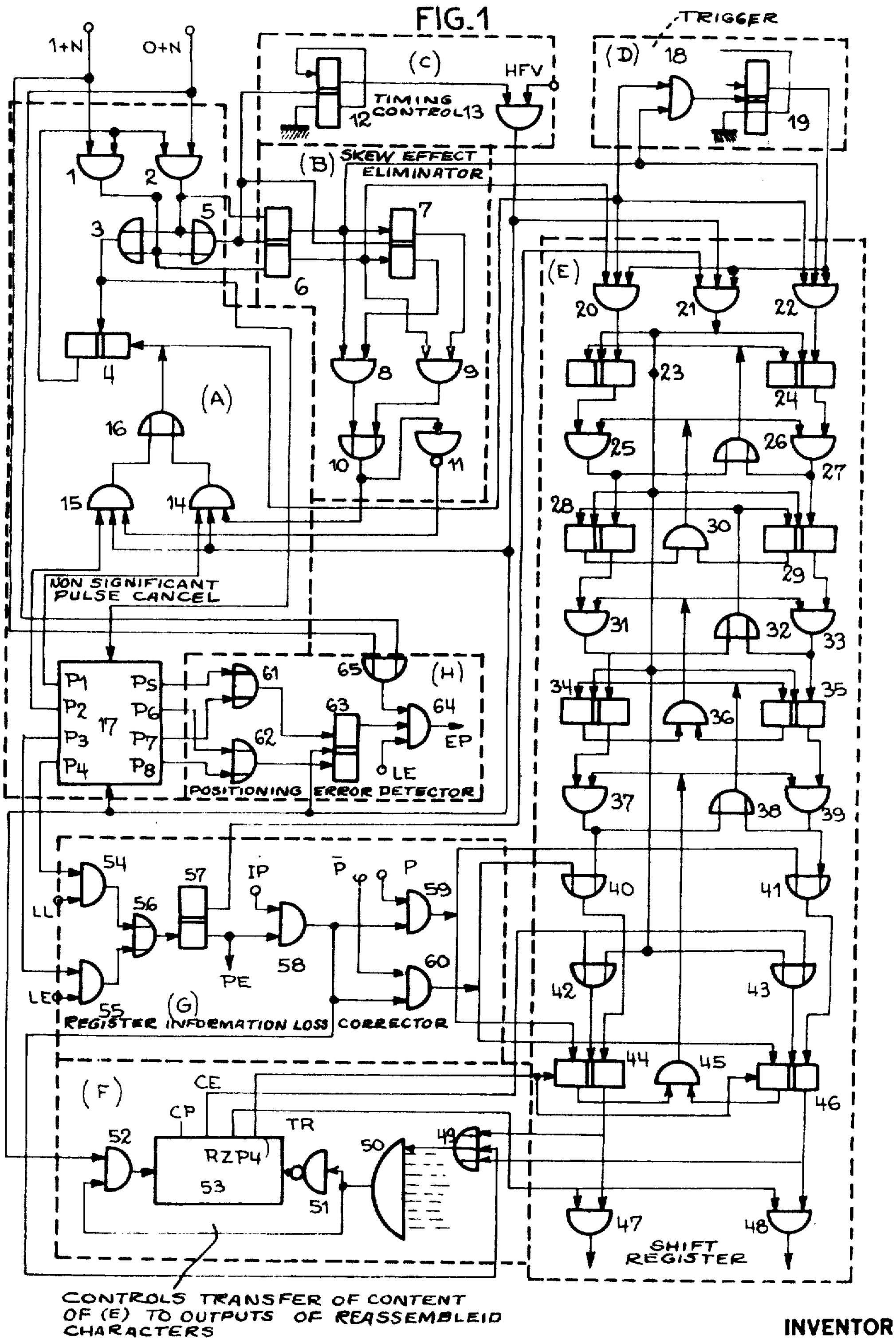

The two incoming sequences of pulses are denoted (1+N) and (0+N) and are applied in circuit (A) to two AND-gates 1 and 2. Said gates must be passing only when a bistable circuit 4 is so positioned as to inhibit the transmission of any pulse N through said gates 1 and 2. If this is so, any significant pulse will be, from the union (logical OR) output of the gates 1 and 2, applied to an activation input of the bistable circuit 4 so that the gates are consequently blocked. Between each pulse of the mixed series (1+0) from the OR-gate 3, the said bistable circuit 4 must be brought back to its unactivated condition, as it will be herein after described.

Through said OR-circuit 3 or better, for purely material reasons, through a paralleled OR-circuit 5, the first occurrence pulse in the series (1+0) will authorize the switching of a bistable member 12 in circuit (C) which in turn, unblocks AND-gate 13 in said circuit so that a variable frequency clock signal is applied to the arrangement. It must be understood that said clock, or timing, signal comes from an pulse generator which is not shown but which is a conventional fast timing member in the magnetic tape peripheral equipment and which has in a conventional way its frequency permanently re-adjusted in accordance with the speed of the magnetic tape passing under the read-in and readout heads. Illustratively, the length of any cycle T between the theoretical instants of occurrence of significant pulses at the input terminals (1+N) and (0+N) is made of 32 alternations of the wave shape HFV, see FIG. 2.

The OR signal (1+0) is also applied to the authorization inputs of two cascade-connected bistable circuits 6 and 7. The control inputs of the member 6 are respectively connected to the outputs of gates 1 and 2. The outputs of 6 are always in complementary conditions, the outputs of 7 are always in complementary conditions. Said condition is the reciprocal of the condition of the outputs of 6, when 6 reverses its own condition and coincident with the condition of the outputs of 6 as long as 6 does not reverse its own condition. Consequently, the bistable member 6 stores the information bit which has just been read out and introduced in the arrangement, whereas the bistable member 7 stores the information bit which has been read out at the preceding readout time instant. The content of these members is permanently decoded by a circuit arrangement operating as an "exclusive-OR" for these outputs. As known, an exclusive-OR circuit consists of two AND-gates, 8 and 9, followed by a logical OR circuit 10. The output of 10 is a "plain" one, and through an inverter 11, this output is also available in its complementary form.

This circuit arrangement is so provided as to take into account the magnetic skew effect in the reset control of 4. It has been determined that, because of the skew effect, any non significant pulse N, when occurring, is slightly advanced with respect to its theoretical instant of occurrence when the two significant digits prior to it are of identical values, either 00 or 11 any nonsignificant pulse N, on the other hand, is slightly delayed with respect to its theoretical instant of occurrence, when said two prior significant digits are of reversed values, either 01 or 10.

It may be, that for certain high quality tapes, the magnetic skew is of negligible value. In such a case, circuit (B) may be omitted.

The clock signal HFV is applied to the actuation control input of a counter 17, which is reset to zero by any and all pulses from the (1+0) series appearing at the output of OR-gate 3. When there are no gaps in said series of pulses, the counter 17 will repeat a cycle such as indicated by T1 in FIG. 2, the first pulse $I_1$ being followed by a pulse $I_2$ which resets the counter and so on. Whenever there is a gap in this series corresponding to a loss of an information bit, and for instance when $T_2$ is not present, the counter describes a cycle $T_2$ during which this loss of information bit will be signaled from one of the other of the two signals $P_3$ and $P_4$ according to a process which will be herein later described.

During a cycle $T_1$, the following decoder signals of the content of the counter are formed and, for the purpose of the explanation, the following signals are formed:

$$P_1 = \bar{B}_0 \cdot B_1 \cdot B_2 \cdot \bar{B}_3 \cdot B_4, \quad \text{(i)}$$

$$P_2 = B_0 \cdot B_1 \cdot B_2 \cdot \bar{B}_3 \cdot B_4 . \quad \text{(ii)}$$

Signal $P_1$ , advancing by half an alternation of HFV with respect to the time instant ¾ T of cycle $T_1$, is applied to an input of an AND-gate 14 receiving the clock signal and the plain output of the Exclusive-OR circuit of (B). Signal $P_2$, delayed by one-half of an alternation of HFV with respect to the time instant three-fourths of T in cycle $T_1$, is applied to the input of an AND-gate 15 also receiving the clock signal and the complementary output from the Exclusive-OR circuit of (B). The outputs of 14 and 15 are applied to a logical OR circuit 16 the output of which is connected to the reset input of the bistable member 4. Consequently, and regardless of the value of the magnetic skew, the bistable circuit 4, activated by the first significant pulse of the beginning of the cycle T for blocking the gates 1 and 2, will be reset. This unblocks said gates after a time interval during which any non significant pulse N cannot pass through said gates 1 and 2 and consequently cannot reach an input of the assembly shift register (E). On the other hand, the next significant pulse, either 0 or 1, occurring after the reset, will be duly transmitted by the corresponding gate 1 or 2. When (B) is omitted, a single one of the gates 14 and 15 suffices, receiving on its inputs the clock signal and a decoded signal marking the passage to ¾ T of the counter: either signal $P_1$ or signal $P_2$ of else, a signal issuing from a logical-OR circuit receiving $P_1$ and $P_2$, or, as a further alternative, a signal marking the passage of the counter to the content $(P_1+P_2)/2$.

The "1" pulses and the "0" pulses available at the outputs of the gates 1 and 2 must be respectively routed to inputs of the shift register (E), through the input gates 20 and 22 thereof. In the illustrated embodiment, said inputs are connected to the outputs of the bistable member 6 of (B). When (B) is omitted, such a bistable member as 6 is preserved for this transfer purpose to (E).

Circuit (H) of the first sub-assembly is intended for detection of the positioning errors of the information bits when read-in on the magnetic tape on the concerned magnetic track. In this respect, during each "normal" cycle such as $T_1$, the following signals are generated form the counter 17:

$$P_5 = B_0 \cdot \bar{B}_1 \cdot \bar{B}_2 \cdot \bar{B}_3 \cdot \bar{B}_4 \cdot \bar{B}_5 \quad \text{(iii)}$$

delayed by one-half of an alteration on the nearest time to the first alternation of HFV in this cycle $T_1$; and, $$P_6 = B_0 \cdot \bar{B}_1 \cdot B_2 \cdot B_3 \cdot \bar{B}_4 \cdot B_5, \quad \text{(iv)}$$

advanced by one-half of an alternation on the nearest time instant from the significant first pulse in said cycle at which a nonsignificant pulse N could occur;

$$P_7 = \bar{B}_0 \cdot \bar{B}_1 \cdot B_2 \cdot \bar{B}_3 \cdot B_4 \cdot \bar{B}_5, \quad \text{(v)}$$

advanced by one-half of an alternation of HFV on the last possible instant of occurrence of a non significant pulse N during said cycle $T_1$; and, $$P_8 = \bar{B}_0 \cdot \bar{B}_1 \cdot \bar{B}_2 \cdot B_3 \cdot B_4 \cdot \bar{B}_5, \quad \text{(vi)}$$

advanced by one-half of an alternation of HFV with respect to the nearest possible time of occurrence of the next significant pulse following the one which activated the concerned cycle $T_1$.

Consequently, signals $P_5$ and $P_8$ mark a "window" during which must appear any significant pulse corresponding to a bit which has just been "read in" on the track of the tape and immediately "read out" for checking the result of such a read-in operation. Similarly, signals $P_6$ and $P_7$ define a window during which may appear a nonsignificant pulse N in such an immediate readout.

Signals $P_5$ and $P_6$ are applied to the inputs of a bistable circuit 63, the control of which is authorized by the clock signal HFV. Signals $P_7$ and $P_8$ must be similarly used and, as the time intervals defined by said signals are not overlapping, the same bistable member 63 may be used: $P_5$ and $P_7$ are applied to an OR-gate 61, $P_6$ and $P_8$ are applied to an OR-gate 62 and the control inputs of 63 are actually connected to the respective outputs of such OR-gates. An output of 63, of a "true" or high level during the above defined time intervals, is connected to an input of an AND-gate 64 unblocked by a signal LE marking a readout during read-in operation, said signal coming from the control circuits of the equipment. An "information" input of 64 receives the output of 65, which is an OR-gate receiving the two series of incoming pulses (1+N) and (0+N). When a pulse of said sequence (1+N)+(0+N) passes through gate 64, a positioning error exists at the read-in operation of the information bit. An alarm signal EP will be generated for signalling purposes in this respect.

Circuit (G) includes a detector arrangement for a loss of an information bit, as well during normal readout (LL) as during readout following read-in (LE). Counter 17, when it is not reset to zero by a significant pulse, starts a cycle $T_2$ during which are formed such signals as defined by:

$$P_3 = B_0 \cdot \bar{B}_1 \cdot B_2 \cdot \bar{B}_3 \cdot \bar{B}_4 \cdot B_5, \quad \text{(vii)}$$

and, $$P_4 = B_0 \cdot B_1 \cdot B_2 \cdot \bar{B}_3 \cdot \bar{B}_4 \cdot B_5, \quad \text{(viii)}$$

slightly delayed with respect to the time interval during which a significant pulse ought to have arrived during said cycle $T_2$. Signal $P_3$ is applied to a gate 55 unblocked from the signal LE and signal $P_4$ is applied to a gate 54 unblocked by the signal LL. The outputs of said AND-gates are applied to an OR-gate 56 the output of which controls the actuation of a bistable member 57. When one of the signals $P_3$ and $P_4$ reaches said bistable member 57, this later turns "true," or high, an output PE which may actuate any signaling device indicating the loss of an information bit on the track. The other output of 57 comes "false" and cuts off the normal operation of the shift register (E).

It may be noted that it is not imperative to use two distincts signals for indicating the loss of an information bit during a normal readout and during a readout during read-in operation. This is here a refinement for controlling in a more accurate fashion the read-in operations, and consequently, postwards, for easing a normal readout (thus preventing at least partly the action of the magnetic skew at such readout operation). If desired, signal $P_3$ could be omitted and signal $P_4$ preserved and directly applied to the bistable member 57.

In the concerned example of embodiment, the shift register (E) is made of four memory stages: bistable members 23–24, bistable members 28–29, bistable members 34–35, and bistable members 44–46. Said stages are cascade-connected through AND-gates: 25 and 27 between 23,24 and 28–29; 31 and 33 between 28,29 and 34,35; 37 and 39 between 34,35 and 44,46. The connections between the outputs of gates 37 and 39 and the control inputs of 44 and 46, however, include OR-gates 40 and 41, for a reason to be hereinafter described. The AND-gates inhibit the transfer of an information bit from one stage to the next one when the latter is not free, which is checked by an AND-gate receiving the conditions of the bistable members of said stage. AND-gate 45 is associated with bistable members 44 and 46 and its output is only "true" when both members 44 and 46 are in the same condition. The output from 45 is carried back to the gates 37 and 39. Similarly AND-gate 36 checks the condition of the members 34–35 and its output is connected back to AND-gates 31 and 33. AND-gate 30 checks the condition of the stage 28–29 and its output is connected back to the gates 25 and 27.

Figure 3:
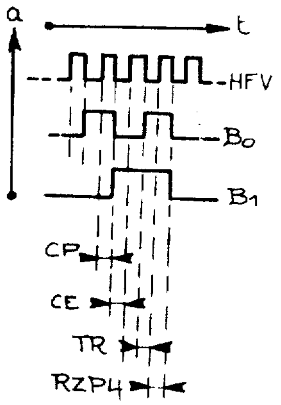

The outputs of gates 25 and 27 are applied to the OR-gate 26 the output of which is connected to the reset inputs of the members 23 and 24 for clearing said stage after its content has been read out for transferring its information bit to the next stage. Similarly the outputs of the gates 31 and 33 are connected to an OR-gate 32 the output of which is connected to the reset inputs of members 28 and 29; the outputs of gates 37 and 39 are connected to an OR-gate 38 for the resetting of members 34 and 38. The resetting of the members 44 and 46 of the last stage is, in normal operation, ensured from a reset output RPZ4 of a decoder forming part of a counter 35 of circuit (F) when said last stage has been read out from a transfer control signal TR formerly generated at 53 and unblocking the gates 47 and 48 of the register (E). Counter 53 receives the clock signal HFV through an AND-gate 52 controlled from an authorization signal formed at 50 as the result of a test of simultaneous existence of a significant bit in each of the last stages of the shift registers of all the tracks of the magnetic tape. Said circuit 50 is an AND-gate operating on such signals and each of said signals is supplied from an OR-gate 49 having its inputs connected to outputs of the bistable member 44,46, one of which is actuated when such an information bit exists. Said circuit 49 further receives, when needed, from circuit (G) a signal the generation and purpose will be herein after described. Counter 53 is reset by a signal denoting the clearance of the last stages of the shift registers affected to the information tracks of the tape. Said signal is supplied by the output of an inverter 51 connected to the output of the circuit 50. Illustratively, counter 53 is made of two cascade-connected bistable members. FIG. 3 shows the relations between the conditions of said members and the decoder outputs from 53: output CP delivers a signal to be used in an imparity check, the result of which will be used when an information bit is lost on one trace of the tape; then a signal CE is issued for correcting an error appearing on a track ; both these operations will be herein later described. Thereafter, counter 53 issues the transfer control signal TR and the reset signal RAZP4.

Omitting for the present time, the correction of an error on a track, the operation of the shift register may be explained as follows: said register comprises three input AND-gates 20, 21, and 22. For enabling an introduction of data in the register, it is necessary that the bistable member 19 of circuit (D) be adequately positioned. Said member 19 is controlled from a trigger made of an AND-gate 18 receiving the reset signal for the bistable circuit 4 of circuit (A) and the significant pulse available at the output of the bistable member 6 marking the reception of a binary digit "1." In a conventional magnetic tape system of the concerned character it is usual that a character comprised of a binary digit "1" existing on all the tracks be the first of any information "block." Consequently, the incoming of said binary digit "1" will activate the circuit (C), hence application of the clock pulse signal to the arrangement and, finally, the activation of the bistable member 19 through the gate 18. The shift register (E) is then ready for reception of the significant character digits.

AND-gate 21 has its output distributed to the authorization inputs of the bistable members of the four stages of the shift register, by a direct connection for the three first stages, through OR-circuits 42 and 43 for the fourth one, said OR-circuits further receiving the signal CE from the counter 53. AND-gate 21 receives the clock pulse signal and can only deliver it when the bistable member 57 of circuit (G) is at rest. Said member 57 only reverses its condition when the concerned track is in error, i.e., when it presents a loss of an information bit as detected by the above described method.

AND-gate 20 receives the output of the member 6 which marks the existence of a significant digit in the (0+N) incoming sequence, the signal of such a significant digit being to introduce into the shift register at a time instant P1 or P2, i.e., at a time of resetting of the bistable member 4 in the first sub-assembly. AND-gate 22 similarly receives the output of 6 which denotes the existence of a significant digit in the (1+N) sequence, to be also transferred into the shift register at one of said time instants. The output of 20 is connected to the activation input of 23, the output of 21 is connected to the activation input of 24.

At rest, all the bistable members in the register are set to zero. Considering first the incoming of a digit "1." the member 24 is actuated to work when a clock pulse coincides, through gate 21, with a reset pulse of the member 4, through gate 22. Since 28–29 is at rest, both AND-gates 25 and 27 are unblocked. The next clock pulse will control the progression by one stage of the digit recorded in the first stage, from an actuation of 29 through 27, which will simultaneously reset the first stage to zero through 26, the activation to work of 29 blocking the circuit 30 and consequently blocking the circuits 25 and 27. The next clock pulse will transfer the significant digit from the second to the third stage through a similar operation concerning gate 33, bistable member 35, gate 36, gates 31–33 and circuit 32 resetting to zero the member 29. The next clock pulse will similarly control the transfer of the information bit from the third to the fourth stage of the register. Bistable member 46 being set at work, a voltage is applied through OR-gate 49 to the corresponding input of AND-gate 50. As a similar progression concomitantly occurred in the shift registers assigned to the other information tracks, with a more or less important time shift from one track to the other ones, according to the variations of recording of the tape, circuit 50 is finally unblocked for triggering the counter 53 and producing the read out of the fourth stage of the register and its return to rest. Normally, a four step advance of an information bit controlled from four successive clock pulses is sufficient not to have a new digit presented at the input of the shift register. However, if this had been the case, said new digit would have seen its advance blocked at the second stage of the register since the third stage is blocked until clearance of the fourth stage of the register.

When the next digit is a "0," the similar operation occurs but the said information bit will have a progression concerning the bistable members 23, 28, 34, and 44 of the stages.

Figure 2:
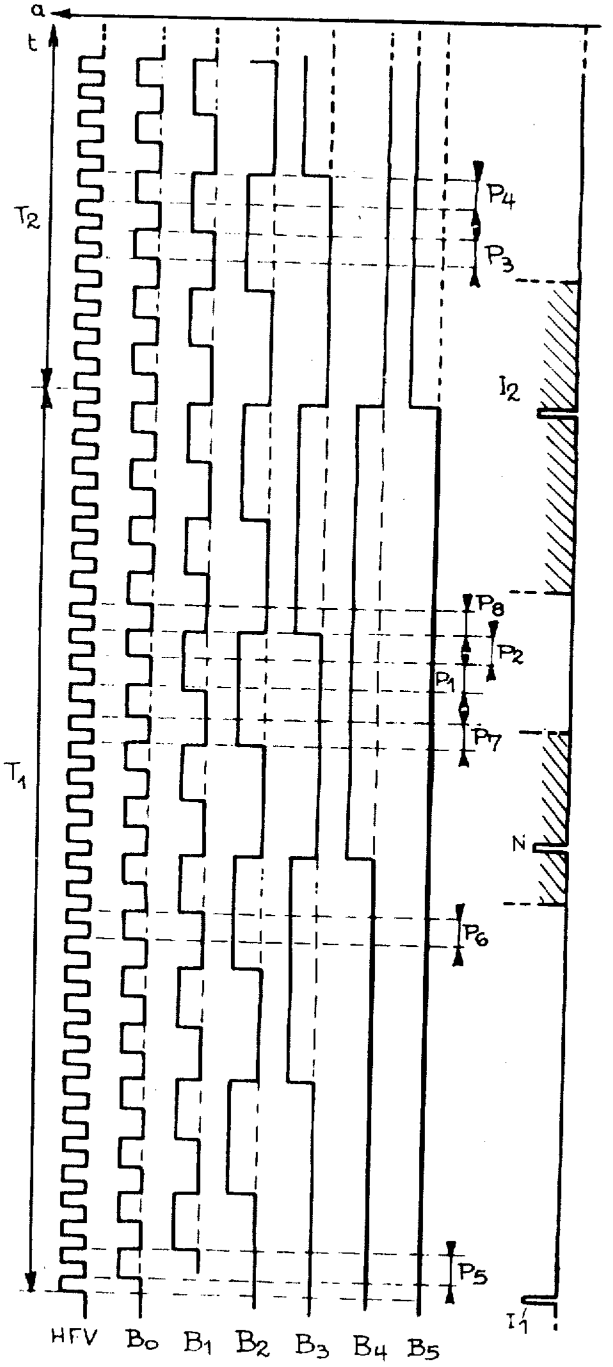

Back to consideration of circuit (C) of the second sub-assembly, it has been said that signaling of a loss of an information bit was ensured therein from the actuation to work condition of the bistable member 57 when counter 17 comes into an "abnormal" cycle such at $T_2$, FIG. 2. Once said member so set, there is no more introduction of further bits into the register since gate 21 is blocked. However, circuit 58 is unblocked and, if there is no other error in any one of the other tracks, circuit 58 will transfer to its output a voltage IP generated as follows: each one of the bistable members 57 makes part of an error register comprising as many bistable members as are magnetic information tracks; decoding said register produces a "true" (high) voltage IP when one track, and a single one, is in error; it produces a low or "false" voltage in any other case. Said voltage IP is applied through 58 to the circuit 49 through which it is applied to the multiple AND-gate 50 as if the fourth stage of (E) actually contained an information bit. This enables the activation of counter 53 as all the other inputs of gate 50 are activated. Further, said voltage IP is applied to the inputs of two further gates, 59 and 60; these AND-gates respectively receive on their other inputs voltages P and $\overline{P}$ , the nature of which will be later explained.

The output of 59 is connected, through the OR-circuit 41, to the actuation input of the bistable member 46 of the fourth stage of the register and, directly, to the reset input of the bistable member 44 of said fourth stage. Conversely, the output of 60 is applied to the reset input of 46 and, through the OR-circuit 40, to the actuation input of 44. As said, the output CE of the counter 53 is connected to the authorization input of both 44 and 46 through the OR-circuits 42 and 43.

When only one track presents an error on a magnetic tape, there exists a possibility of reconstitution of the mutilated characters. It is conventional to have recourse, in such a kind of magnetic tape recording, to a control, usually named "imparity control" and which consists of the read-in on any transverse line of the tape, an additional digit "1" or "0" on an additional track according to whether, and for instance, the number of digits "1" in said line is odd or even, or conversely. The digits of said additional track are conventionally read out together with the information significant digits and may be processed by an arrangement similar to that of FIG. 1. However, the shift register of said additional arrangement will be, for the purpose of the invention, read prior to the readout signals TR from the counters 53, which is indicated by the output signal CP from said counter 53 the occurrence of which is prior to that of TR, see FIG. 3. The signal P applied to the gate 59 will be the one existing for instance at the output 47 of the shift register of said additional track processing arrangement, and passing through an AND-gate the other input of which is connected to the output PE of circuit (G) of the concerned arrangement. The signal $\overline{P}$ applied to the gate 60 will then be the complementary signal of P, through an inverter connected to the output of said gate. It may also be, as an alternative, the signal from the output 48 of the shift register of said additional arrangement passing through an AND-gate identically controlled as for P. When CE issues from 53, the bistable members 44 and 46 are authorized and a digit of a binary value complementary to that of the imparity digit is recorded in the fourth stage of the shift register (E) of the track in error through the activation to work of the member 46 from the output of 59 and the voltage P denoting a "0" imparity digit, or through the activation to work of the member 44 from the output of 60 and the voltage $\overline{P}$ denoting a "1" value of said imparity digit. Correction of a track which is in error may consequently be automatically ensured, provided that, and as long as, this track is the only one on the tape having an erroneous read-in.

All variations of the above described embodiment enter in the field of the present invention as defined by the appended claims.

What is claimed is:

1. A processing system for a signal read out from a phase modulation recorded track of a magnetic tape, said signal consisting of two distinct series of "1" and "0" significant pulses between which pulses nonsignificant pulses from time to time occur, said system comprising:

a first sub-assembly and a second sub-assembly, said first sub-assembly conditioning the said signal for exploitation in said second sub-assembly, a part of a character reconstituting system involving the corresponding sub-assemblies of the processing systems devoted to the other tracks of said magnetic tape, wherein said first sub-assembly includes a pair of input circuits respectively receiving the said series of pulses;

means for eliminating the said nonsignificant pulses from the outputs of said input circuits;

and means connected to said outputs for temporarily storing the remaining significant pulses issuing therefrom, said pulse temporary storing means having outputs connected to respective inputs of the said second sub-assembly and wherein said second sub-assembly includes a clock controlled shift register and means for controlling the progression and issuance of significant pulses throughout said register.

2. Processing system according to claim 1, wherein said means for eliminating nonsignificant pulses in the incoming two series of pulses comprises a bistable member, an OR-circuit having its inputs connected to the outputs of said input circuits, and the output of which is connected to the activation input of said bistable member; a connection from the output of said bistable member to a blocking input of each one of the said input circuits; clock pulse supply means; a clock pulse counter having a reset input connected to the output of said OR-circuit; a decoder circuit arrangement for decoding the condition of said counter, activated at about three-fourths of the cycle count of said counter, and an AND-gate arrangement controlled from the output of said decoder circuit arrangement and receiving the clock pulses from the said clock pulse supply means and having an output connected to the reset input of said bistable member.

3. Processing system according to claim 2, wherein said pulse temporary storing means includes first and second cascaded-connected two-condition members and an Exclusive OR circuit fed from the outputs of said first and second two-condition members and having its output connected to an additional control input of the said AND-gate arrangement and wherein the outputs of the said first two-condition member are connected to respective input circuits of the significant pulse shift register in the second sub-assembly.

4. Processing system according to claim 3, wherein said decoder circuit arrangement presents two time-shifted activated outputs and said AND-gate arrangement includes two distinct gate-circuits respectively connected to the said decoder outputs and wherein the said Exclusive OR circuit has plain and complementary outputs respectively connected to control inputs of the said distinct gate-circuits, and gate-circuits having a common output to the reset input of the said bistable member.

5. Processing system according to claim 2, wherein said clock pulse counter comprises first cycle counter means and second cycle counter means, and wherein the said decoder circuits are connected to said first cycle counter means and wherein further decoder circuits are connected to said second cycle counter means, activated at about one-fourth of the second cycle count of said counter; and a significant bit loss responsive circuit fed from the outputs of said further decoder circuits and including a two-condition member, the condition of which is changed in response to an activation of the said further decoder circuits.

6. Processing system according to claim 5, wherein the significant pulse inputs of said shift register consist of AND-gates controlled from the output of the AND-gate arrangement controlling the reset of the said bistable member and wherein a progression control input of the said shift register consists of an AND-gate receiving the clock pulses from the said clock pulse supply means and controlled from the output of the two-condition member, a part of the said significant bit loss responsive circuit.

7. Processing system according to claim 6, including a trigger member having its output connected to respective activation inputs of said AND-gates, the inputs of the said shift register; and an AND-circuit having inputs respectively connected to the output of the said AND-gate arrangement controlling the reset of said bistable member and to an output of said temporary storing means which AND-circuit has its output connected to the actuation input of said trigger member.

8. Processing system according to claim 2, wherein a further decoder circuit arrangement is connected to said counter, activated at counts where no pulse must normally occur in the input signal of the system, said further decoder circuit arrangement having first and second outputs, a two-condition member has its inputs respectively connected to said first and second outputs, wherein an OR-circuit receives the two incoming series of pulses and wherein an AND-circuit activated in a read after write condition of the system has its inputs respectively connected to an output of said two-condition member and to the output of said OR-circuit, the output of said AND-gate casually making a condition of an error of positioning of a pulse on the track of the tape.

9. Processing system according to claim 2, wherein said clock pulse supply means comprises an AND-circuit receiving the incoming clock pulses on one input thereof, and a trigger circuit controlled for activation from a connection to the output of said OR-circuit at the first "1" significant bit on said output and having its output connected to another input of said AND-circuit.

10. Processing system according to claim 1, wherein in said second sub-assembly, said means for issuance of the significant pulses from said clock controlled shift register comprises clock pulse supply means; a clock pulse counter for sequentially reading-out and resetting the last stage of said shift register from readout and reset outputs thereof; an AND-circuit having as many inputs as are tracks on the magnetic tape; means in each one of the track signal processing systems for forming a signal responsive to the activated condition of the last stage of the shift register thereof, the outputs of said last named means being connected to the inputs of said AND-circuit; means for resetting said counter at the activation of the output of said AND-circuit; and a gate connected to the activation input of said counter receiving on its inputs the clock pulses from said clock pulse supply means and the output signal from said AND-circuit.

11. Processing system according to claim 10, wherein said first sub-assembly includes means for detecting the loss of a significant bit in the input signal thereof and for memorizing the said loss condition; gating means having inputs connected to the said loss memorizing means in all the processing systems of the signals read out from the tracks of the tape and responsive to the loss of a bit in one only of said tracks; an OR-connection of the output of said gating means to a mixer circuit in the said means forming the said signal responsive to the activation condition of the last stage of said shift register in said second sub-assembly; a pair of parity and imparity controlled circuits having their inputs connected to the output of said gating means and having respective outputs connected to inputs of said last stage of said shift register; and wherein the said clock pulse counter comprises an output activated prior to the activation of the said readout and reset outputs of the last stage of said shift register and connected to inputs of said last stage of said shift register authorizing the introduction in said last stage of a substitute information bit responsive to the conditions of the outputs of said parity and imparity controlled circuits.

* * * * *